(12) United States Patent
Ouvrier-Buffet (10) Patent No.: US 8,373,123 B2
(45) Date of Patent: Feb. 12, 2013

(54) BOLOMETRIC DETECTOR FOR DETECTING ELECTROMAGNETIC RADIATION IN THE REGION EXTENDING FROM INFRARED TO TERAHERTZ FREQUENCIES AND AN ARRAY DETECTION DEVICE COMPRISING SUCH DETECTORS

(75) Inventor: Jean-Louis Ouvrier-Buffet, Sevrier (FR)

(73) Assignee: Commissariat a L'Energie Atomique Et Aux Energies Alternatives, Paris (FR)

( * ) Notice: Subject to any disclaimer, the term of this patent is extended or adjusted under 35 U.S.C. 154(b) by 318 days.

(21) Appl. No.: 12/729,651

(22) Filed: Mar. 23, 2010

(65) Prior Publication Data
US 2010/0276597 A1    Nov. 4, 2010

(30) Foreign Application Priority Data
Apr. 30, 2009    (FR) ...................... 09 52862

(51) Int. Cl.
*G01J 5/24*    (2006.01)
(52) U.S. Cl. .................................................. 250/338.1
(58) Field of Classification Search ............... 250/338.1
See application file for complete search history.

(56) References Cited

U.S. PATENT DOCUMENTS

| | | | |
|---|---|---|---|
| 6,329,649 B1 | 12/2001 | Jack et al. | |
| 6,329,655 B1 | 12/2001 | Jack et al. | |
| 6,891,503 B1 * | 5/2005 | Savry et al. | 343/700 MS |
| 6,985,116 B2 * | 1/2006 | Agnese et al. | 343/703 |
| 7,038,623 B2 * | 5/2006 | Frazier | 343/700 MS |

OTHER PUBLICATIONS

E. Peytavit et al.,"Room Temperature Terahertz Microbolometers," Infrared and Millimeter Wavers and 13th International Conference on Terahertz Electronics, 2005, IRMMW-THZ 2005, the Joint 30th International on Williamsburg, VA, Sep. 19-23, 2005, Piscataway, NY, IEEE, vol. 1, Sep. 19, 2005, pp. 257-258.

Rafaël Perez, "Contribution to the Theoretical and Experimental Analysis of GPR Bscan, Performances of the Antennas : Contribution of a Multistatic Configuration" University of Limoges Doctoral School Science Technology, Dec. 10, 2005, No. 34-2005 Thesis, Electronics of High Frequencies and Optoelectronics, Specialty: Telecommunications.

* cited by examiner

*Primary Examiner* — Constantine Hannaher
(74) *Attorney, Agent, or Firm* — Burr & Brown (57) ABSTRACT

This bolometric detector for electromagnetic radiation comprises: a first and a second crossed bow-tie antenna intended to collect electromagnetic radiation; a resistive load coupled to said antennas in order to convert the collected electromagnetic power into calorific power; a bolometric micro bridge structure suspended above substrate by support and thermal isolation arms with the micro bridge comprising: the resistive load; a thermometric element coupled to resistive load so that its temperature can rise due to the effect of the calorific power produced. The first antenna is located outside micro bridge and is capacitively coupled with the resistive load and the second antenna is located in micro bridge and is resistively coupled with the resistive load.

6 Claims, 5 Drawing Sheets

Fig. 1

PRIOR ART

Fig. 2

PRIOR ART

Fig. 3

PRIOR ART

BOLOMETRIC DETECTOR FOR DETECTING ELECTROMAGNETIC RADIATION IN THE REGION EXTENDING FROM INFRARED TO TERAHERTZ FREQUENCIES AND AN ARRAY DETECTION DEVICE COMPRISING SUCH DETECTORS

BACKGROUND OF THE INVENTION

1. Field of the Invention

The present invention relates to the field of antenna-based bolometric detectors and, more especially, detectors with two crossed bow-tie antennas designed to detect electromagnetic radiation in the region extending from infrared and, in particular the 3-5 µm and 8-14 µm bands, to terahertz frequencies.

2. Description of Related Art

Detection in the infrared range has many applications which are already widely known. As for terahertz frequencies, i.e. the range of frequencies from 100 GHz to 10 terahertz, envisaged applications include the following (this list is not exhaustive):

medical diagnostics where terahertz detection gives access to details of anatomical structure and chemical reactions which take place therein; neither x-rays or ultrasound provide this information;

military and flight safety applications, e.g. the construction of anti-stealth radar systems or high-resolution radars which provide good target discrimination;

studying and detecting atmospheric pollution; submillimeter-wave observations provide important information on the chemistry of the atmosphere, thus enabling unrivalled monitoring of airborne pollutants such as dinitrogen trioxide, for example, which is difficult to detect using conventional techniques because it has strong absorption lines in the far infrared region;

identification of chemical species; many complex chemical compounds have a signature in the terahertz region which is sufficiently unique to allow their reliable detection, for example, certain explosives and toxic products, some compounds which are released as fruits ripen and even some compounds released by industrial combustion;

analysis of phenomena at a molecular or atomic level; terahertz spectroscopy makes it possible to obtain new information on mechanisms such as photoexcitation, photodissociation and solvation. The same applies to the analysis of molecular interactions (vibratory states of molecules or hydrogen bonds for instance), condensed phase systems, dynamic processes in large molecules such as peptides and proteins and even observing and orienting polymers using a technique based on terahertz radiation;

studying the properties of materials such as semiconductors in order to determine, non-destructively, their mobility, for example, the dynamics of ultra-fast carriers and carrier-phonon interactions, supraconductors, polymers, ceramics, organic materials and porous materials. Moreover, materials such as plastics, paper and textiles are transparent in the terahertz region, metals are perfect reflectors and water is highly absorptive. Thus, detection in this region is especially suitable for inspecting packaged products or monitoring manufacturing processes in situ in real-time, for example; and broadband telecommunications; the trend towards ever higher data rates, for terrestrial communications and communications between satellites, is encouraging manufacturers to develop systems which operate at frequencies which are already several hundred gigahertz and in the future may be as high as several terahertz.

Usually, a resistive bolometric detector measures the power of incident radiation in the infrared region and, to achieve this, comprises an absorbing resistive bolometer element which converts the luminous flux into a heat flow which causes the temperature of said element to rise relative to a reference temperature. This increase in temperature then induces a change in the electrical resistance of the absorbing element which causes variations in the voltage or current across the latter's terminals. These electrical variations constitute the signal which is output by the detector.

However, the temperature of the absorbing element usually depends largely on its environment, especially that of the substrate which comprises the electronic readout circuit. In order to make the absorbing element as insensitive as possible to its environment, thereby improving the sensitivity of the detector, the absorbing element is generally thermally isolated from the substrate.

Figure 1:
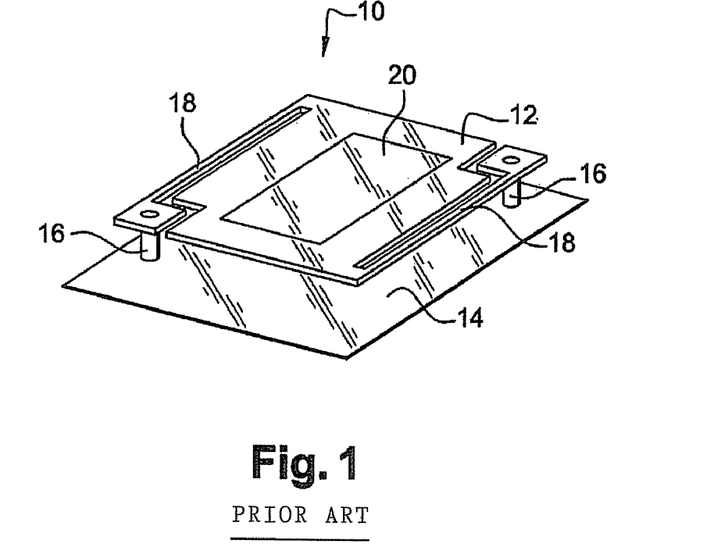
FIG. 1 is a schematic perspective view of an elementary bolometric detector according to the prior art which has already been described above.

FIG. 1 is a schematic perspective view of an elementary resistive bolometric detector 10 according to the prior art, showing the principle of this thermal isolation. This elementary detector, shown here in the form of a suspended membrane, is classically part of a one or two dimensional array of elementary detectors.

Detector 10 comprises a thin membrane 12 which absorbs incident radiation and is suspended above substrate support 14 by two conductive posts 16 to which it is attached by two thermally isolating support arms 18. Membrane 12 usually comprises an electrically insulating layer made of, for example, $SiO_2$, SiO, SiN, ZnS or another material which lends membrane 12 its mechanical rigidity, and a metal electrical interconnect layer deposited on the insulating layer.

A thin layer 20 of resistive thermometric material is also deposited in the centre of membrane 12 on the metal interconnect layer, especially a layer of a semiconductor material such as weakly or highly resistive polycrystalline or amorphous p- or n-type silicon or an oxide of vanadium ($V_2O_5$, $VO_2$) produced in a semiconducting phase.

Finally, substrate support 14 comprises an electronic circuit incorporated in a silicon wafer which is usually referred to as a "readout circuit". The readout circuit comprises, firstly, elements to excite (stimulate) and read thermometric element 20 and, secondly, multiplexing components which make it possible to serialize the signals obtained from the various thermometric elements contained in the array detector.

During operation, membrane 12 warms up due to the effect of incident electromagnetic radiation and the calorific power produced is transferred to the layer of thermometric material 20. The readout circuit in substrate 14 periodically biases membrane 12 by subjecting posts 16 to a bias voltage and taps off the current flowing through thermometric element 20 in order to deduce the variation in its resistance from this and hence the incident radiation which produced said variation.

Because the layout and operation of such a detector is conventional, it is not explained in further detail here for the sake of conciseness. It must, however, be noted that membrane 12 has three main functions apart from thermal isolation: An antenna function in order to receive radiation, a conversion function to convert received electromagnetic power into calorific power and a thermometric measurement function to measure the produced calorific power. Because it acts as an antenna, the dimensions of membrane 12 are consequently selected so that they are of the same order of magnitude as the wavelength of the radiation that is to be measured.

In the terahertz region, wavelengths can be as much as 1 mm and this therefore requires a membrane of roughly the same size. However, with such dimensions, the calorific mass, mechanical strength and radiation losses of the membrane are so problematic that they ultimately have an adverse effect on the efficiency of the detector.

This is why, for such a frequency range, the radiation receiver function is separated from the other functions. The radiation receiver function is thus fulfilled by a planar antenna and the function to convert electromagnetic power into calorific power is fulfilled by the antenna's resistive load. The dimensions of the load classically meet the requisite impedance matching conditions, which depend on the geometry of the antenna and the nature of the layers which support it, in order to obtain optimal conversion. The resistive load is also in thermal contact with a thermometric element used to measure the calorific power produced. This assembly then constitutes a bolometer with an antenna.

In such a configuration, the thermometric element is independent of the antenna and its size therefore no longer depends on the incident wavelength but on factors which determine the inherent performance of the detector (sensitivity, signal-to-noise ratio, etc.) appropriately, depending on the requirements of the application in question, active imaging or passive imaging for example.

In addition, in most cases, the incident electromagnetic radiation is not polarized so receiving it using just one antenna therefore makes it impossible to pick up all the available electromagnetic power. Nevertheless, non-polarized radiation can be regarded as two orthogonally superimposed, linearly polarized components, with each of these components transporting half the energy of the wave. As is well-known in itself, one efficient way of picking up incident electromagnetic radiation is to use two crossed bow-tie antennas. The bow-tie antenna is explained, for example, in the doctoral thesis with the following citation:

PEREZ Rafaël. Contribution à l'analyse théorique et expérimentale de radargrammes GPR: performances des antennes: apports d'une configuration multistatique [En ligne]. Thèse de doctorat: Électronique des Hautes Fréquences et Optoélectronique. Limoges: Université de Limoges, 2005.

Figure 2:
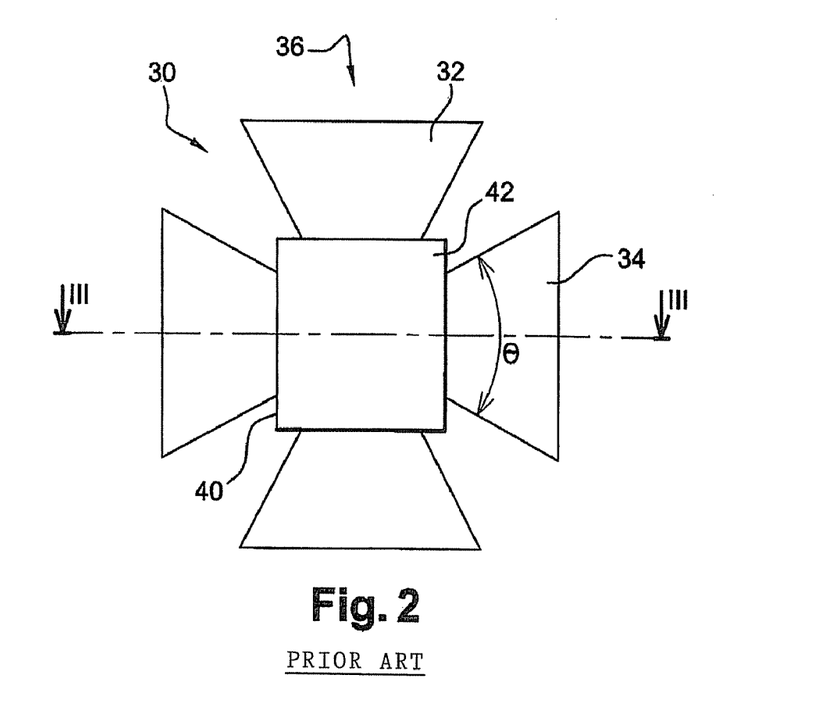
FIGS. 2 and 3 are top and cross-sectional schematic views of an antenna-based bolometric detector according to the prior art which has already been described above.

Document U.S. Pat. No. 6,329,655 describes an antenna-based bolometer 30 which operates in the millimeter range and is fitted with two crossed bow-tie antennas 32, 34; schematic top and cross-sectional views of this bolometer are shown in FIGS. 2 and 3 respectively.

Figure 3:
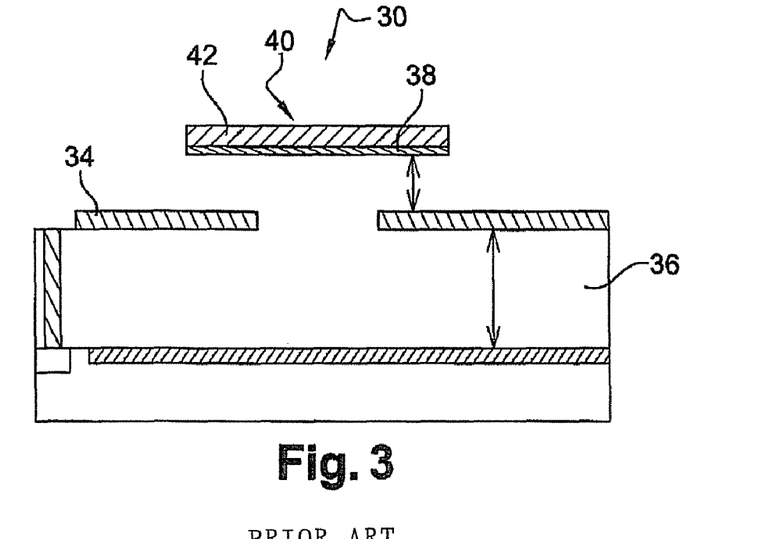

The principle of bolometer 30 is based on capacitive coupling between antennas 32, 34 located above substrate support 36 and a resistive load 38 located in a suspended membrane 40 on which thermometric element 42 is placed (FIG. 3).

Resistive load 38, which takes the form of a square layer positioned over the centre of antennas 32, 34, actually has a surface that faces the antennas and therefore forms a capacitance together with the antennas. The radiation picked up by antennas 32, 34 is thus transferred to load 38 by capacitive coupling.

However, the shape of the resistive load poses problems in terms of impedance matching.

It is estimated that impedance matching, and hence capacitive coupling, is actually optimal for this load when the following equation is satisfied:

$$\sqrt{\left(\frac{1}{\pi \cdot f \cdot C}\right)^2 + (R \cdot C)^2} \approx 100 \, \Omega$$

where f is the frequency of the radiation, C is the value of the capacitance formed between antennas 32, 34 and resistive load 38, and R is the value of the resistance of resistive load 38.

Increasing the value of capacitance C to achieve optimum impedance matching or coupling is pointless because this assumes that there is either a submicron gap between antennas 32, 34 and load 38 or a large overlap surface area between them.

However, reducing the distance between the antennas and the load to a value of 100 to 200 nm poses difficulties in terms of physical phenomena (Casimir effect affecting mechanical stability, significant radiative heat transfer resulting in deterioration in thermal isolation of the thermoelectric element and hence a drop in the sensitivity of the detector) as well as current fabrication techniques (control of residual stresses in layers to prevent unwanted contacts or control of sacrificial layers used to form the gap between the antennas and the resistive load).

Not only that, increasing the size of the resistive load in order to increase the opposite-facing surfaces presents exactly the same problems as those that led one to separate the receive function and the conversion and thermometric functions as stated earlier. Consequently, to adapt the device for the terahertz domain, the value of capacitance C is not freely selectable.

In such a configuration, resistive load 38 must be weakly resistive, i.e. a sheet resistance of 50Ω to 200Ω, in order to ensure optimal coupling compatible with terahertz radiation. Due to inherent design features, this results in unwanted, practically optimal coupling with the infrared radiation emitted by bodies at 300° K. which is very difficult to eliminate effectively without impairing the quality of the signal in the terahertz frequency range.

Because of this, it is difficult to obtain optimum impedance matching and capacitive coupling using a resistive load associated with two antennas and having a square shape in the centre of the detector without, at the same time, also making coupling of the detector with infrared radiation optimal.

Moreover, because the two antennas 32, 34 are both placed on substrate 36, they are coupled via the substrate. It is observed that the gain of the detector is substantially reduced, thus making its use relatively unsatisfactory. For electrical connection reasons, especially the ease with which contact points can be fabricated between the readout circuit in the substrate and the thermometric element of the membrane, the substrate is usually as thin as possible. However, because this thickness e must satisfy the equation e=λ/4 n where n=√∈, the permittivity ∈ will be very high and this will increase coupling between the two crossed antennas. Thus, it is not possible to reduce decoupling between the antennas by choosing the substrate accordingly without also significantly modifying the layout and operation of the electronic elements integrated in the substrate.

SUMMARY OF THE INVENTION

The object of the present invention is to propose a resistive bolometric detector with two crossed bow-tie antennas where there is no coupling between the antennas.

To achieve this, the object of the invention is a bolometric detector for detecting electromagnetic radiation in the region extending from infrared to terahertz frequencies, comprising:
- a first and a second crossed bow-tie antennas intended to collect electromagnetic radiation;
- a resistive load coupled to said antennas in order to convert the collected electromagnetic power into calorific power;
- a bolometric micro bridge structure suspended above the substrate by support and thermal isolation arms with the micro bridge comprising:
  - the resistive load;
  - a bolometric or thermometric element coupled to the resistive load so that its temperature can rise due to the effect of the calorific power produced.

According to the invention, the first antenna is located outside the micro bridge and is capacitively coupled with the resistive load and the second antenna is located in the micro bridge and is resistively coupled with the resistive load.

Here, the term "micro bridge" is taken to mean the structure suspended above the substrate and which therefore comprises, in particular, the bolometric membrane and the second antenna.

In other words, the antennas are separated from each other by the gap between the micro bridge and the substrate so that there is reduced coupling between them, especially coupling via a material.

According to one preferred embodiment of the invention, the resistive load comprises a metal film and the micro bridge comprises winglets arranged facing the first antenna on this metal film so as to obtain impedance matching between the first antenna and the metal film. The winglets preferably have a shape similar to the central parts of the first antenna. In particular, the winglets are covered in an electrically insulating material and the bolometric element is placed at least partially on said insulation and at least partially in contact with the metal film.

In other words, the dimensions, shape and material of the winglets are designed to obtain optimal impedance matching with the first antenna independently of the second antenna.

Thus, in contrast with the prior art where the resistive load of an antenna produces both impedance matching and electromagnetic power conversion for both the antennas, the invention makes provision for additional dedicated impedance matching elements of the first antenna. Since the impedance matching function is at least partially decoupled from the conversion function, there is an additional degree of freedom when it comes to choosing the resistive element pressed against the winglets which is also tasked with electromagnetic power conversion and which is, for instance, the metal film which is usually present in the micro bridge in order to electrically connect the thermometric element on which the second antenna, for example, rests.

According to one embodiment of the invention, the resistive load comprises a metal layer and the second antenna is placed at least partially on this metal film or metal layer which, for example, is usually present in order to electrically connect the thermometric element to the readout circuit.

In other words, here the resistive film fulfils the function of converting the electromagnetic power received by the second antenna, independently of the winglets and the first antenna.

According to one embodiment of the invention, the first antenna is located on the substrate.

According to one embodiment of the invention, the first antenna is formed at least partially above the micro bridge. The first antenna thus forms a shield for the thermometric element and this limits the absorption of stray radiation.

The object of the invention is also an array detector for detecting electromagnetic radiation in the region extending from infrared to terahertz frequencies which, according to the invention, comprises a one or two dimensional array of bolometric detectors of the above-mentioned type.

BRIEF DESCRIPTION OF THE DRAWINGS

The invention will be made more readily understandable by the following description which is given merely by way of example and relates to the accompanying drawings in which identical references denote identical or analogous components and in which.

DETAILED DESCRIPTION OF THE INVENTION

An elementary bolometric detector 50 according to a first embodiment of the invention which is part of an array of elementary detectors is described below, making reference to FIGS. 4 to 7.

Figure 4:
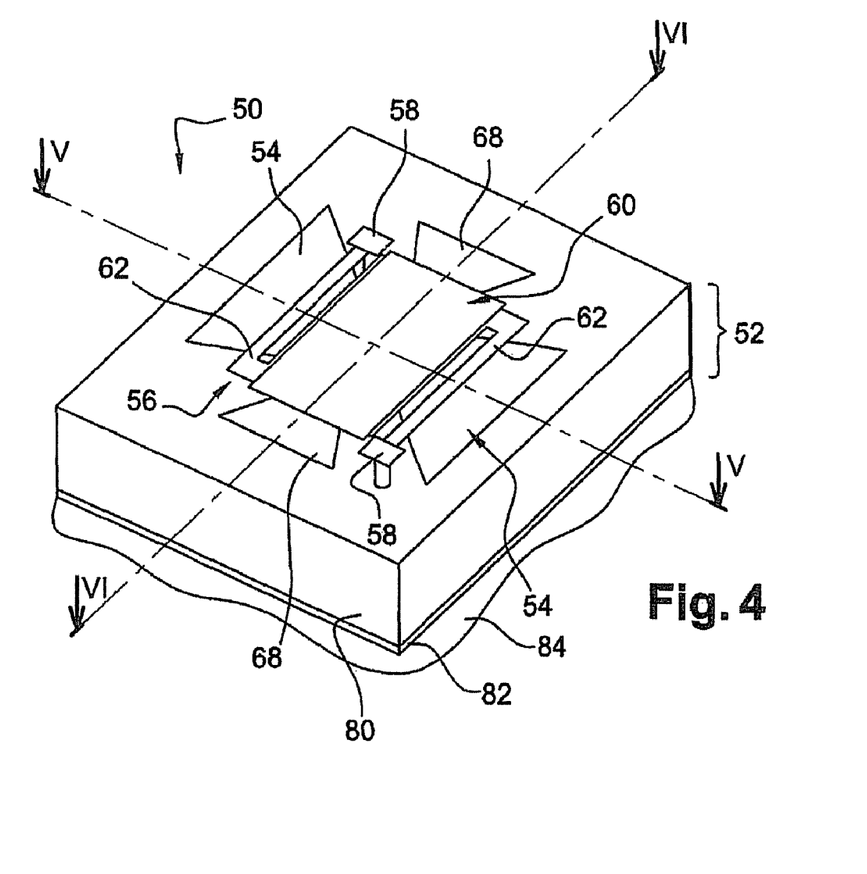
FIG. 4 is a schematic perspective view of a first embodiment of a bolometric detector in accordance with the invention.
Figure 5:
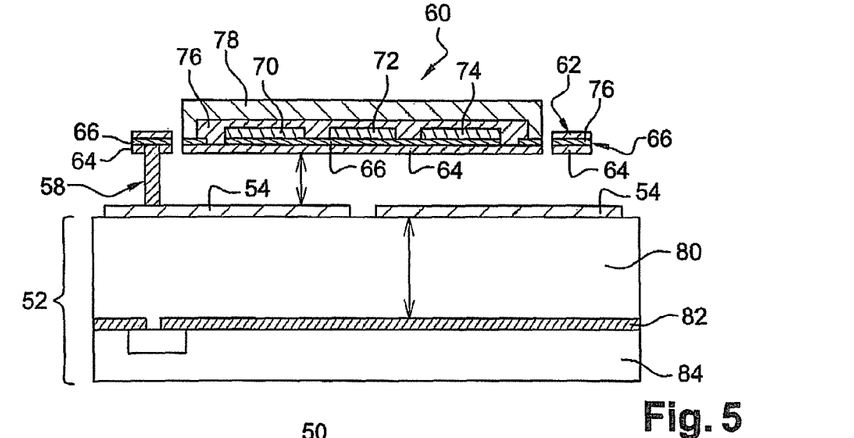
FIGS. 5 and 6 are cross-sectional views of the detector according to the first embodiment in planes V-V and VI-VI in FIG. 4 respectively.
Figure 6:
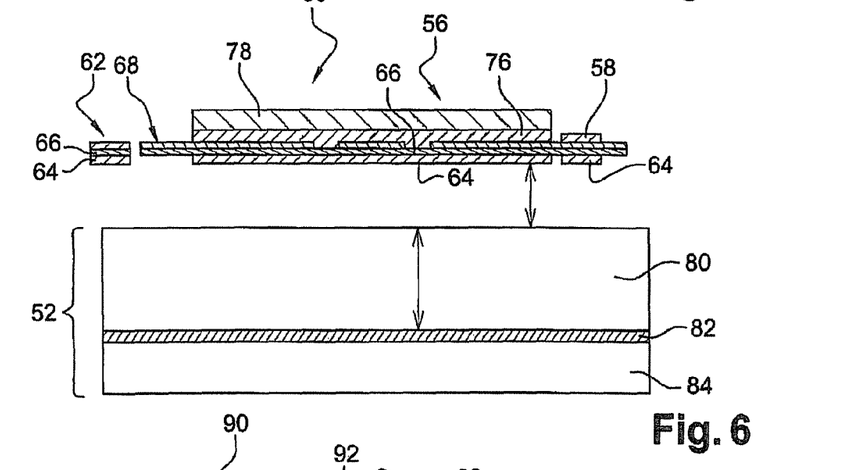

Bolometer 50 comprises insulating substrate 52 on which a first planar bow-tie antenna 54 made of a conductive material is deposited as well as a micro bridge 56 which is suspended above substrate 52 by two conductive posts 58.

Micro bridge 56 is formed by central part 60 and two thermal isolation arms 62 which connect central part 60 to posts 58 at right angles to the main axis (V-V) of first antenna 54. Micro bridge 56 comprises a first electrically insulating layer 64, a conductive layer 66 and, more especially, a metal film deposited on insulating layer 64.

A second bow-tie antenna 68 made of a conductive material and located crosswise relative to first antenna 54 and having its main axis (VI-VI) parallel to thermal isolation arms 62 is also formed on conductive layer 66 of micro bridge 56 and extends either side of central part 60. Second bow-tie antenna 68 is thus resistively coupled with conductive layer 66.

Winglets 70, 72, 74 made of the same material as antennas 54, 68 are also provided on conductive layer 66 with surfaces which face first bow-tie antenna 54. Winglets 70, 72, 74 are thus capacitively coupled with antenna 54 and they are also chosen to perform impedance matching with the latter in a way which will subsequently be explained in more detail.

Winglets 70, 72, 74 and the portion of second bow-tie antenna 68 located in central part 60 are covered in insulating layer 76 in order to electrically insulate them, with part of conductive layer 66 being left exposed.

A layer of thermometric material 78 is also deposited on insulating layer 76 in contact with conductive layer 66 in the area of that part of the layer which is left free of insulating layer 76.

Finally, substrate 52 comprises insulating layer 80 which has a low absorption coefficient in the wavelength range over which the detector operates, and reflector 82; layer 80 and reflector 82 form a resonant cavity for antennas 54, 68 in the frequency range which is of interest. Finally, functional layer 84 which comprises the readout circuits of the detector is provided underneath reflector 82.

Figure 7:
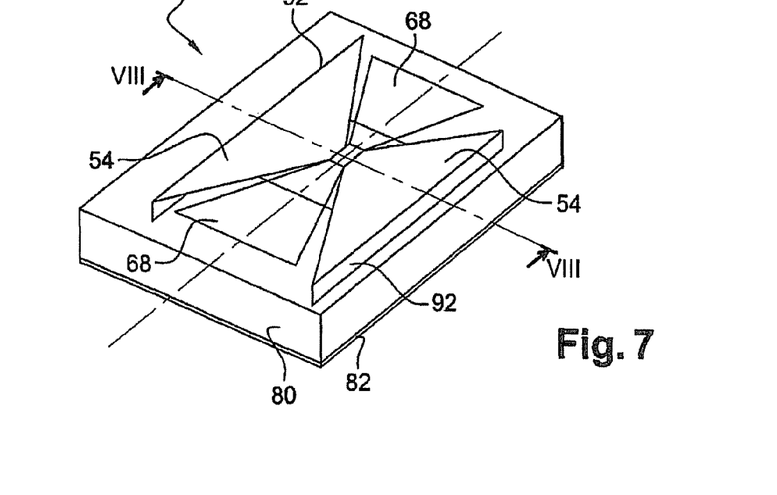
FIG. 7 is a schematic perspective view of a second embodiment of a bolometric detector in accordance with the invention.
Figure 8:
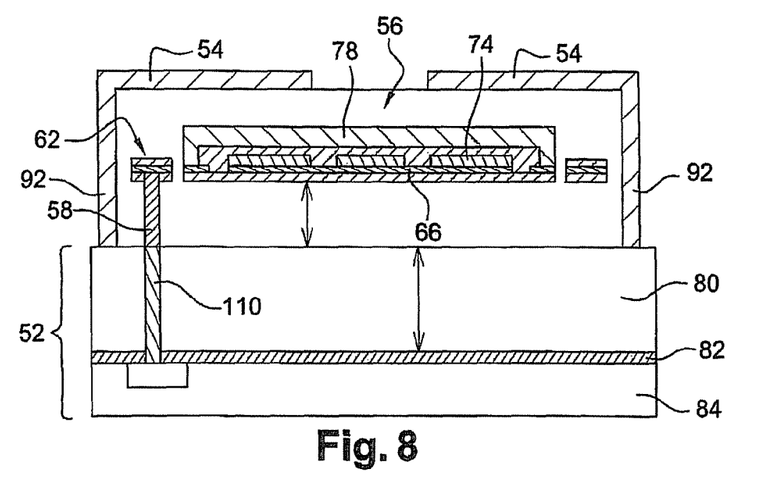
FIG. 8 is a schematic cross-sectional view of the detector according to the second embodiment in plane VIII-VIII in FIG. 7.

FIGS. 7 and 8 are schematic perspective and cross-sectional views of a second embodiment according to the invention. This second embodiment differs from the first embodiment in terms of the placement of first antenna 54. The first antenna is placed above micro bridge 56 by means of support structure 92 rather than being placed on substrate 52. In particular, this makes it possible to form a shield for thermometric element 78 and this limits the absorption of stray radiation.

More especially, first antenna 54 forms a shield above thermal isolation arms 62, posts 58 and the contacts between thermometric element 78 and conductive layer 66; this is especially advantageous given the fact that these elements usually have resistance characteristics which are sensitive to infrared radiation in the 8 μm-14 μm frequency band.

Note that the resistive load of antennas 54, 68 is defined by this conductive layer 66 and, in particular, by those areas of this layer which are uncovered.

During operation, electromagnetic radiation is collected by bow-tie antennas 54, 68. The electromagnetic power picked up by first antenna 54 is then transferred to winglets 70, 72, 74 by capacitive coupling. The electromagnetic power transferred to winglets 70, 72, 74 is then converted into heat by conductive layer 66 on which the winglets are formed.

The electromagnetic power picked up by second antenna 68 is directly converted by conductive layer 66 on which the antenna rests. The temperature of thermometric element 78, which is in contact with conductive layer 66, then rises due to said contact and its resistance is modified. Conductive layer 66, which also fulfils a bias electrode function for thermometric element 78, is then biased at regular intervals in order to subject thermometric element 78 to a bias voltage, thus causing a current to flow through the latter in order to ascertain the variation in its resistance in a manner which is, of itself, known.

Figure 9:
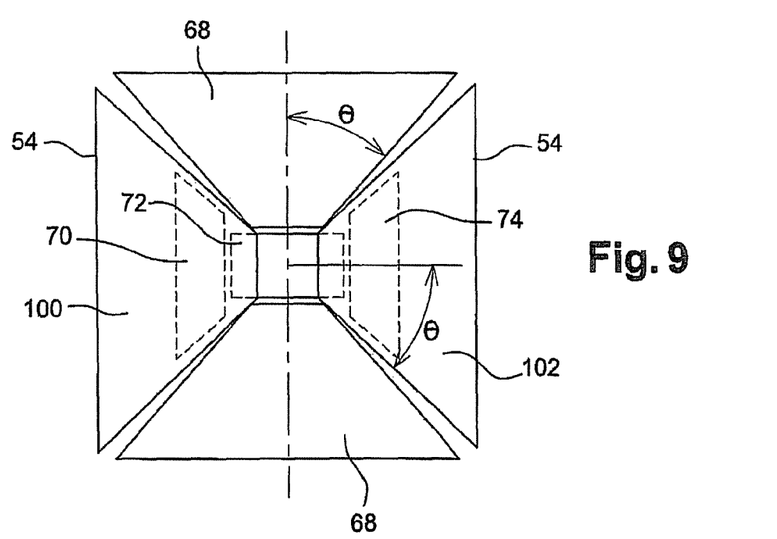
FIG. 9 is a schematic top view showing the impedance matching winglets which are part of the first embodiment.

The top view shown in FIG. 9 schematically shows first and second bow-tie antennas 54, 68 as well as winglets 70, 72, 74. It can be seen that first central rectangular-shaped winglet 72 straddles the two wings 100, 102 of bow-tie antenna 54 and the two lateral winglets 70, 74 face parts 100, 102 of first antenna 54 respectively. Lateral winglets 70, 74 have a shape and size that are substantially identical to part of antenna 54. The winglets have a trapezoidal shape which is equivalent to the trapezoidal part of the antenna located opposite them. Its surface area advantageously corresponds to the capacitance C needed to obtain impedance matching. Optimal impedance matching is obtained this way.

In addition, the resistive load of the antennas, defined by the portions of conductive layer 66 located between winglets 70, 72, 74 and between the parts of second antenna 68, has a reduced surface area. Because this surface area is reduced, coupling of the detector according to the invention with infrared radiation (which is, as an initial approximation, proportional to the size of the resistive load) is therefore also reduced.

Also, the length of antennas 54, 68 and the winglets, and their trapezoidal angle θ, are selected so as to increase or reduce the bandwidth of the detector.

Figure 11:
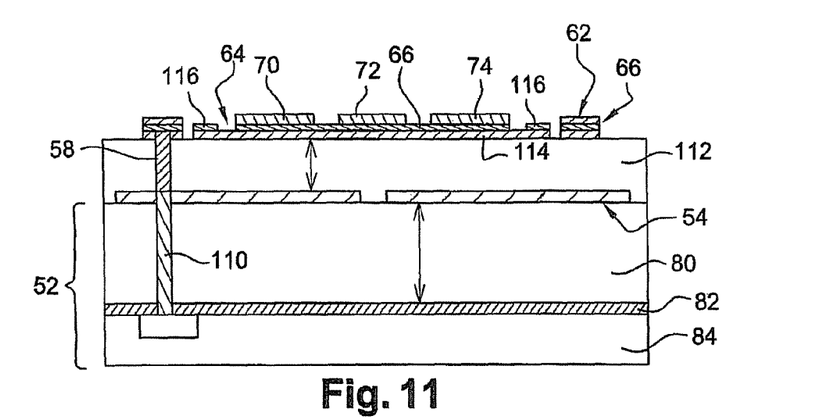
Figure 12:
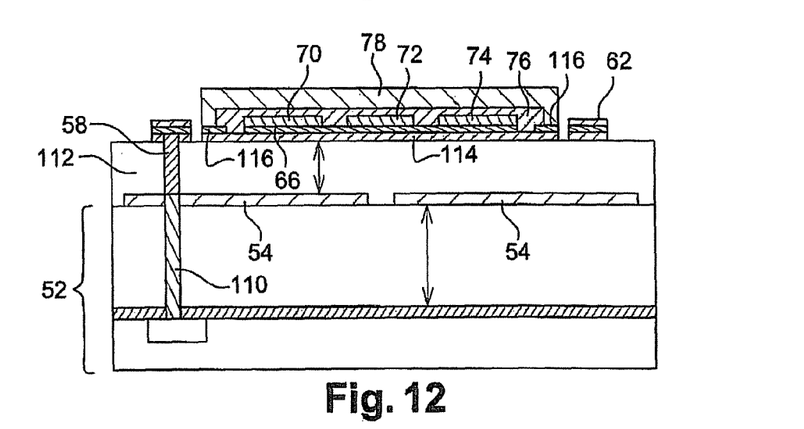

A method for fabricating the detector according to a first embodiment of the invention is described below making reference to FIGS. 10 to 12.

Figure 10:
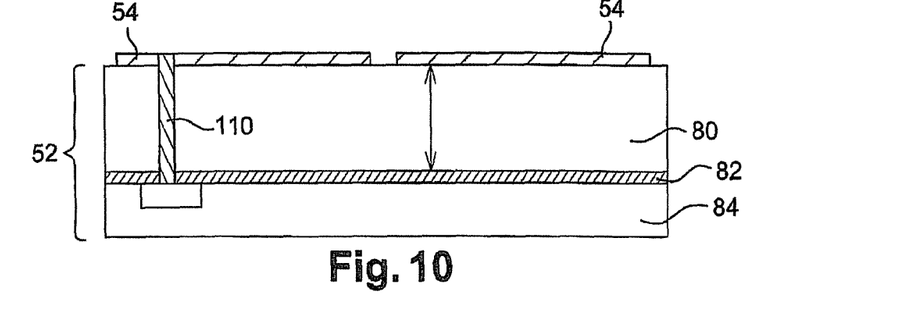
FIGS. 10 to 13 are schematic cross-sectional views showing a method for fabricating a detector according to the invention.

As shown in FIG. 10, cavity 80, 82 of the detector is formed by reflector 82 placed on readout circuit 84 as, for example, a layer of aluminum, and a layer of insulating material 80 which has the lowest possible absorption coefficient in the wavelength range over which the detector operates. For example, layer 80 consists of SiO, $SiO_2$, SiN, $Ta_2O_5$, $Ta_2O_5$—$TiO_2$, $HfO_2$, $SrTiO_3$, $Ba_{1-x}Sr_xTiO_3$ or a mixture thereof.

Layer 80 also has a thickness of 1 μm to 500 μm, adjusted to the value λ/(4 n) where:

λ is a wavelength in the operating frequency range of the detector, for example the central wavelength of this band; and $n=\sqrt{\in}$, ∈ is the dielectric permittivity of the material from which layer 80 is made.

A resonant cavity is thus obtained for the terahertz radiation which is the object of detection.

Electrical connections 110 also pass through layer 80, for example as extensions of posts 58, in order to electrically connect readout circuit 84 and thermometric element 78. For instance, vias are made in layer 80 using a conventional technique and the vias thus produced are capped by a metal such as tungsten, aluminum or copper by using a damascene technology in association with a planarization technique.

First antenna 54, made of a conductive material such as aluminum, tungsten silicide, titanium or another material is formed on layer 80 by using a conventional photolithography technique, it has a thickness of 0.1 μm to 0.5 μm.

Once substrate 52 and first antenna 54 have been fabricated, sacrificial layer 112 (FIG. 11), made of polyimide, for example, and having a thickness of 0.5 μm to 5 μm is formed on antenna 54 and layer 80. The thickness of the sacrificial layer is chosen to produce high-performance capacitive coupling between first antenna 54 deposited on substrate 52 and winglets 70, 72, 74 which will be formed at a later stage. This thickness is chosen to be as small as possible without compromising the mechanical strength of the micro bridge (electrostatic bonding).

Insulating layer 64 is then deposited on sacrificial layer 112; then thin metal film 66, consisting of Ti, TiN, Pt, NiCr or another material for example, is deposited on insulating layer 64.

As described earlier, metal film 66 fulfils an electrical power supply and readout function for thermometric element 78 via thermal isolation arms 62 and a resistive load function through its surface which is in contact with winglets 70, 72, 74 and second bow-tie antenna 68. Insulating layer 64 and thin film 66, each having a thickness of 0.005 μm to 0.05 μm, are preferably deposited by Plasma Enhanced Chemical Vapor Deposition (PECVD) or cathode sputtering and are then chemically etched or plasma etched to form isolation arms 62. Metal film 66 is also chemically etched or plasma etched to form central portion 114 on which winglets 70, 72, 74 and second antenna 68 will be formed, and lateral portions 116 which will be in contact with thermometric element 78 in order to power it and read it.

The sheet resistance of metal film 66 is advantageously chosen so as to obtain effective thermal isolation of micro bridge 56 relative to readout circuit 84. The sheet resistance of metal film 66 is preferably 100Ω per square to 500Ω per square because this is the value of the access resistances of the materials used in order to improve thermal resistances (arms of the bolometer). Finally, metal film 66 is connected to readout circuit 84 through conductive posts 58, which are produced through sacrificial layer 112 in a similar manner to connections 110, and electrical connections 110.

Second antenna 68 and winglets 70, 72, 74 consist of a conductive material such as aluminum, tungsten silicide, titanium or another material. To form them, a layer of conductive material having a thickness of 0.1 μm to 0.5 μm is deposited on central portion 114 of metal film 66 by cathode sputtering or by Low Pressure Chemical Vapor Deposition (LPCVD) or Plasma Enhanced Chemical Vapor Deposition (PECVD); the second antenna and winglets are then formed by chemical etching, plasma etching or by using a lift-off type technique for said layer. Or alternatively, the antenna and winglets consist of metal multilayers.

Antenna 68 and winglets 70, 72, 74 thus formed define regions which convert electromagnetic radiation into electrical current and define exposed areas of metal film 66 which convert electric current into thermal energy.

Second antenna 68 and winglets 70, 72, 74 are then covered in a layer of insulating material 76, such as SiN, SiO, ZnS or another material. Layer 76 has a thickness of 0.005 μm to 0.1 μm and is produced in order to prevent any short-circuit between winglets 70, 72, 74 and thermometric element 78. Layer 76 is, for instance, produced using a low-temperature deposition technique such as cathode sputtering or Plasma Enhanced Chemical Vapor Deposition (PECVD). Layer 76 is then etched by chemical or plasma etching, for example, in order to expose the lateral parts 116 of metal film 66 to which thermometric element 78 and thermal isolation arms 62 will be connected.

Thermometric element 78 is then deposited on layer 76 and lateral portions 116 by using a low-temperature deposition technique such as sputtering for example. The material from which thermometric element 78 is made is, for example, an amorphous or polycrystalline semiconductor such as Si, Ge, SiC, a-Si:H, a-SiGe:H, a metallic material or even an oxide of vanadium or magnetite oxide. This material must have a Temperature Coefficient Resistance (TCR) which is not zero. In other words, it has a resistance which varies as a function of temperature.

Finally, sacrificial layer 112 is removed, the nature of the latter determines the removal technique, the preferred technique is chemical or plasma etching.

It is apparent that etching of the materials that constitute the detector according to the invention is obtained mostly or exclusively by using chemical etching techniques, where applicable assisted by plasma etching; these techniques make it possible to achieve accurate, reproducible etching.

Figure 13:
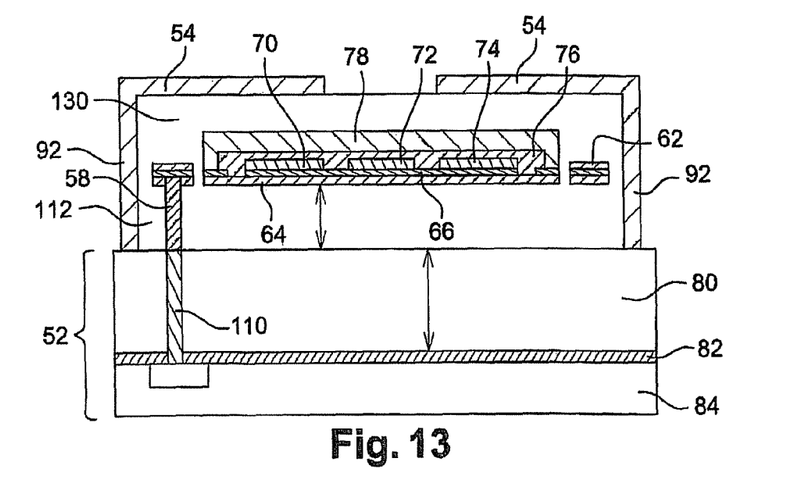

When first bow-tie antenna 54 is located above micro bridge 56, sacrificial layer 130 (FIG. 13) is deposited all over micro bridge 56 and first sacrificial layer 112 used to produce the micro bridge. Sacrificial layers 112, 130 are then etched in order to produce antenna 54 supports 92. Supports 92 can, for example, consist of a material different to that of antenna 54, for example an insulating material deposited by Low-Pressure Chemical Vapor Deposition (LPCVD). Finally, bow-tie antenna 54 is formed by depositing and then etching a conductive layer such as that described above and the sacrificial layers are then eliminated.

The invention achieves:
decoupling of the bow-tie antennas which are no longer in the same plane and no longer deposited on the same support;
optimal impedance matching thanks to winglets, impedance matching is also obtained independently for each of the antennas;
a very small resistive load surface area which reduces coupling of the detector with infrared radiation which is, as an initial approximation, proportional to the surface area of the load.

The invention claimed is:

1. A bolometric detector for detecting electromagnetic radiation in a region extending from infrared to terahertz frequencies, comprising:
a first and a second crossed bow-tie antenna intended to collect electromagnetic radiation;
a resistive load coupled to said antennas in order to convert the collected electromagnetic power into calorific power; and
a bolometric micro bridge structure suspended above a substrate by support and thermal isolation arms, with the micro bridge comprising:
the resistive load; and
a thermometric element coupled to the resistive load so that its temperature can rise due to the effect of the calorific power produced;
wherein the first antenna is located outside the micro bridge and is capacitively coupled with the resistive load and the second antenna is located in the micro bridge and is resistively coupled with the resistive load, and
wherein the resistive load comprises a metal film and wherein the micro bridge comprises winglets arranged facing the first antenna on the metal film so as to obtain impedance matching between the first antenna and the metal film.

2. The bolometric detector as claim 1, in wherein the winglets are covered in an electrically insulating material, said thermometric element being placed at least partially on said insulator and being at least partially in contact with the metal film.

3. The bolometric detector as claimed in claim 1, wherein the second antenna is placed at least partially on this metal film.

4. The bolometric detector as claimed in claim 1, wherein the first antenna is placed on the substrate.

5. The bolometric detector as claimed in claim 1, wherein the first antenna is formed at least partially above the micro bridge.

6. An array detector device for detecting electromagnetic radiation in the region extending from infrared to terahertz frequencies, comprising a one or two dimensional array of bolometric detectors in accordance with claim 1.

* * * * *